(12) United States Patent
Wentker et al.

(10) Patent No.: US 8,989,712 B2
(45) Date of Patent: Mar. 24, 2015

(54) MOBILE PHONE PAYMENT PROCESS INCLUDING THRESHOLD INDICATOR

(75) Inventors: Dave Wentker, San Francisco, CA (US); Doug Deibert, Alameda, CA (US); Gavin Shenker, Los Angeles, CA (US); Erick Wong, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 789 days.

(21) Appl. No.: 11/971,711

(22) Filed: Jan. 9, 2008

(65) Prior Publication Data
US 2008/0167000 A1 Jul. 10, 2008

Related U.S. Application Data

(60) Provisional application No. 60/884,290, filed on Jan. 10, 2007, provisional application No. 60/884,212, filed on Jan. 9, 2007.

(51) Int. Cl.
*G06Q 20/32* (2012.01)
*G06Q 30/02* (2012.01)
*H04L 12/66* (2006.01)
(Continued)

(52) U.S. Cl.
CPC ............... *H04L 12/66* (2013.01); *G06Q 20/10* (2013.01); *G06Q 20/20* (2013.01); *G06Q 20/32* (2013.01); *G06Q 20/322* (2013.01);
(Continued)

(58) Field of Classification Search
USPC ............... 455/414.1, 406, 407, 466; 705/39, 705/14.55, 14.64; 719/318
See application file for complete search history.

(56) References Cited

U.S. PATENT DOCUMENTS

| 5,220,501 A | 6/1993 | Lawlor et al. |
| 5,465,206 A | 11/1995 | Hilt et al. |

(Continued)

FOREIGN PATENT DOCUMENTS

| JP | 2004030271 A | 1/2004 |
| JP | 2005110027 A | 4/2005 |

(Continued)

OTHER PUBLICATIONS

Office Action mailed Mar. 1, 2013 in U.S. Appl. No. 11/971,687, 29 pages.

(Continued)

*Primary Examiner* — Ariel Balaoing
(74) *Attorney, Agent, or Firm* — Kilpatrick Townsend & Stockton LLP

(57) ABSTRACT

System, methods, and apparatus provide account balance alerts for a mobile phone used to initiate a transaction when an account balance is close to a credit limit or close to zero or a minimum balance amount. When a consumer uses an account associated with a mobile phone to make a purchase, the account is checked to see if the purchase would result in an account balance within a predetermined threshold of the credit limit in the case of a credit account, or within a predetermined threshold of zero or a minimum balance, in the case of a debit account. If the threshold has been surpassed an account balance alert is automatically sent to the mobile phone. Since the mobile phone was just used for the transaction, the consumer is timely notified of the approach of the balance to the credit/debit limit and can take corrective action in a timely manner.

36 Claims, 8 Drawing Sheets

(51) Int. Cl.
*G06Q 20/10* (2012.01)
*G06Q 20/20* (2012.01)
*G06Q 40/00* (2012.01)

(52) U.S. Cl.
CPC ....... *G06Q 20/3221* (2013.01); *G06Q 20/3278* (2013.01); *G06Q 30/0224* (2013.01); *G06Q 40/00* (2013.01)
USPC .................................................. 455/414.1

(56) References Cited

U.S. PATENT DOCUMENTS

| | | | |
|---|---|---|---|
| 5,530,438 A | 6/1996 | Bickam et al. | |
| 5,539,450 A | 7/1996 | Handelman | |
| 5,615,110 A | 3/1997 | Wong | |
| 5,650,604 A | 7/1997 | Marcous et al. | |
| 5,652,786 A | 7/1997 | Rogers | |
| 5,659,165 A | 8/1997 | Jennings et al. | |
| 5,699,528 A | 12/1997 | Hogan | |
| 5,708,422 A | 1/1998 | Blonder et al. | |
| 5,729,460 A | 3/1998 | Plett et al. | |
| 5,794,210 A | 8/1998 | Goldhaber et al. | |
| 5,826,241 A | 10/1998 | Stein et al. | |
| 5,878,337 A | 3/1999 | Joao et al. | |
| 5,937,396 A | 8/1999 | Konya | |
| 5,945,652 A | 8/1999 | Ohki et al. | |
| 5,949,044 A | 9/1999 | Walker et al. | |
| 5,991,748 A | 11/1999 | Taskett | |
| 6,038,552 A | 3/2000 | Fleischl et al. | |
| 6,064,990 A | 5/2000 | Goldsmith | |
| 6,169,974 B1 | 1/2001 | Baumgartner et al. | |
| 6,267,292 B1 | 7/2001 | Walker et al. | |
| 6,295,522 B1 | 9/2001 | Boesch et al. | |
| 6,394,343 B1 | 5/2002 | Berg et al. | |
| 6,418,420 B1 | 7/2002 | DiGiorgio et al. | |
| 6,439,456 B1 | 8/2002 | Bansal et al. | |
| 6,488,203 B1 | 12/2002 | Stoutenberg et al. | |
| 6,502,747 B1 | 1/2003 | Stoutenberg et al. | |
| 6,529,725 B1 | 3/2003 | Joao et al. | |
| 6,609,113 B1 | 8/2003 | O'Leary et al. | |
| 6,612,487 B2 | 9/2003 | Tidball et al. | |
| 6,761,309 B2 | 7/2004 | Stoutenberg et al. | |
| 6,769,605 B1 | 8/2004 | Magness | |
| 6,814,282 B2 | 11/2004 | Seifert et al. | |
| 6,854,007 B1* | 2/2005 | Hammond | 709/206 |
| 6,994,251 B2 | 2/2006 | Hansen et al. | |
| 7,003,493 B2 | 2/2006 | Weichert et al. | |
| 7,031,939 B1 | 4/2006 | Gallagher et al. | |
| 7,070,094 B2 | 7/2006 | Stoutenberg et al. | |
| 7,120,608 B1 | 10/2006 | Gallagher et al. | |
| 7,194,437 B1 | 3/2007 | Britto et al. | |
| 7,225,156 B2 | 5/2007 | Fisher et al. | |
| 7,357,310 B2 | 4/2008 | Calabrese et al. | |
| 7,373,329 B2 | 5/2008 | Gallagher et al. | |
| 7,389,275 B2 | 6/2008 | Kemper et al. | |
| 7,395,241 B1 | 7/2008 | Cook et al. | |
| 7,415,442 B1 | 8/2008 | Battaglini et al. | |
| 7,447,663 B1 | 11/2008 | Barker et al. | |
| 7,451,114 B1 | 11/2008 | Matsuda et al. | |
| 7,454,232 B2 | 11/2008 | Abhuamdeh | |
| 8,332,272 B2 | 12/2012 | Fisher | |
| 2002/0029174 A1* | 3/2002 | Shimura | 705/26 |
| 2002/0049804 A1 | 4/2002 | Rodriguez et al. | |
| 2002/0128967 A1 | 9/2002 | Meyer et al. | |
| 2002/0152168 A1 | 10/2002 | Neofytides et al. | |
| 2002/0174016 A1 | 11/2002 | Cuervo | |
| 2003/0026429 A1 | 2/2003 | Hammersmith | |
| 2003/0061162 A1 | 3/2003 | Matthews | |
| 2003/0105710 A1 | 6/2003 | Barbara et al. | |
| 2003/0130940 A1 | 7/2003 | Hansen et al. | |
| 2004/0039693 A1 | 2/2004 | Nauman et al. | |
| 2004/0127256 A1 | 7/2004 | Goldthwaite et al. | |
| 2004/0185827 A1* | 9/2004 | Parks | 455/406 |
| 2004/0188515 A1 | 9/2004 | Jiminez | |
| 2004/0225718 A1* | 11/2004 | Heinzel et al. | 709/206 |
| 2005/0037735 A1* | 2/2005 | Coutts | 455/411 |
| 2005/0080697 A1 | 4/2005 | Foss et al. | |
| 2005/0197111 A1* | 9/2005 | Alanara et al. | 455/418 |
| 2005/0209958 A1 | 9/2005 | Michelsen et al. | |
| 2005/0222949 A1 | 10/2005 | Inotay et al. | |
| 2005/0222961 A1 | 10/2005 | Staib et al. | |
| 2007/0045401 A1 | 3/2007 | Sturm | |
| 2007/0057043 A1 | 3/2007 | de la Garza Ortega et al. | |
| 2007/0094132 A1 | 4/2007 | Waterson et al. | |
| 2007/0235539 A1 | 10/2007 | Sevanto et al. | |
| 2008/0010215 A1* | 1/2008 | Rackley, III et al. | 705/70 |
| 2008/0033877 A1 | 2/2008 | Blair et al. | |
| 2008/0078831 A1* | 4/2008 | Johnson et al. | 235/380 |
| 2008/0120231 A1 | 5/2008 | Megwa | |
| 2008/0163257 A1 | 7/2008 | Carlson et al. | |
| 2008/0183480 A1 | 7/2008 | Carlson et al. | |

FOREIGN PATENT DOCUMENTS

| | | |
|---|---|---|
| JP | 2006178525 A | 7/2006 |
| WO | WO 00/46769 | 8/2000 |
| WO | 01/37594 A1 | 5/2001 |
| WO | 2004/090819 A2 | 10/2004 |
| WO | WO2005098769 A | 10/2005 |
| WO | 2006/024080 A1 | 3/2006 |

OTHER PUBLICATIONS

Office Action mailed Feb. 13, 2014 in U.S. Appl. No. 11/971,715, 12 pages.

Japanese Office Action mailed Sep. 18, 2012 in Application No. 2009-545663 issued Sep. 13, 2012.

EP Search Opinion dated Jun. 13, 2012 for PCT/US2008/05064, Application No. 08705811.1. 6 pages.

* cited by examiner

500

| | Data Element | Mandatory/Optional | Type | Length |
|---|---|---|---|---|
| 510 | Unique Message Identifier | Mandatory | | |
| 520 | Issuer Identifier | Mandatory | Number | |
| 530 | Account Identifier | Mandatory | Number | |
| 540 | Credit/Devit Balance to Set Alert At (if an alert is being set up) | Conditional | Value | |
| 550 | Balance Alert Flag to indicate whether balance alerts are on or off | Mandatory | Boolean | |

| | Data Element | Mandatory/Optional | Type | Length |
|---|---|---|---|---|
| 570 | Unique Message Identifier | Mandatory | | |
| 580 | Issuer Identifier | Mandatory | Number | |
| 590 | Account Identifier | Mandatory | Number | |

FIG. 5B

MOBILE PHONE PAYMENT PROCESS INCLUDING THRESHOLD INDICATOR

CROSS-REFERENCE TO RELATED CASES

The present application is a non-provisional application of and claims priority to U.S. Provisional Application No. 60/884,212 entitled "Contactless Transaction" by Wentker et al., filed on Jan. 9, 2007, and to U.S. Provisional Application No. 60/884,290 entitled "Contactless Transaction" by Wentker et al., filed on Jan. 10, 2007, the entire contents of which are herein incorporated by reference for all purposes.

This application is also related to U.S. patent application Ser. No. 11/971,687, entitled "Contactless Transaction ", filed on the same day as the present application, and is also related to U.S. patent application Ser. No. 11/971,715, entitled "Mobile Payment Management", filed on the same day as the present application, and is also related to U.S. patent application Ser. No. 11/971,586, entitled "Mobile Phone Payment With Disabling Feature", filed on the same day as the present application. These applications are herein incorporated by reference in their entirety for all purposes.

BACKGROUND

The present application is generally related to mobile phones for conducting transactions such as transactions involving the purchase of goods and services, and more specifically to providing account balance alerts to such mobile phones.

Some prior systems send consumers notices regarding purchases made and account balances. These prior systems often rely on contact information in the account information to notify the consumer. For example, monthly statements detailing purchases made throughout the month and providing the account balance are typically mailed or e-mailed to a consumer. These statements may also include a maximum limit to an amount of credit. However, a consumer may not know an account balance at some point during the month unless the consumer actively calls or logs onto a server of the issuer of the account.

For example, the statement may not get to the consumer until well after a credit limit has been surpassed. For debit or prepaid accounts, a consumer may reach a zero value at some point during a monthly period. A result of these situations would be a decline of a purchase, which can be embarrassing and result in wasted effort and missed opportunity. Such problems may especially be problematic when many purchases are made during one day or a short time period as almost every consumer could not track the total cost of all purchases. It can also be frustrating to a consumer as remedial action could have been easily made to the account.

Embodiments of the present disclosure address these and other problems, individually and collectively.

BRIEF SUMMARY

Embodiments of the invention relate to providing account balance alerts to a mobile phone used to initiate a transaction when an account balance is close to a credit limit or when an account balance is close to zero or a minimum balance amount. When a consumer uses an account (e.g., a credit card account) associated with a mobile phone to make a purchase, embodiments of the invention check to see if the purchase would result in an account balance within a predetermined threshold of the credit limit in the case of a credit account, or zero or a minimum balance, in the case of a debit account. If the threshold has been surpassed, an account balance alert is automatically sent to the mobile phone. Given that the mobile phone was just used to make the purchase, the consumer will be timely notified of the approach of the balance to the credit/debit limit. Thus, in embodiments of the invention, the same device that is used to conduct a transaction is the same device that notifies the consumer that a balance threshold may have been exceeded.

Using embodiments of the invention, the consumer can take corrective action in a timely manner if the consumer is close to a credit or debit limit associated with an account. For example, if the consumer is close to a credit or debit limit associated with an account, the consumer may use the same phone to select another credit or debit account to use for subsequent transactions. This is can save the consumer some time and potentially some embarrassment (as a result of possibly having a purchase denied, because of insufficient credit or funds), since the consumer will know when the consumer can no longer use a particular credit or debit account.

One embodiment of the invention is directed to a method for sending balance alerts to a mobile phone used to initiate a transaction. Information for a transaction initiated with a mobile phone having a contactless element is received. The contactless element is capable of interacting with a contactless reader in an access device, and the mobile phone is associated with an account of a consumer. An account balance for the account of the consumer is retrieved. The account balance after the transaction is completed is calculated. The calculated account balance is compared to an account balance threshold. A balance alert message is then sent to the mobile phone when the calculated account balance surpasses the account balance threshold.

Another embodiment of the invention is directed to a method of using a mobile phone. A consumer initiates a transaction with a mobile phone. The information associated with the transaction is sent to an issuer of an account associated with a consumer and associated with the mobile phone. A balance alert message is received via the mobile phone when an amount associated with the transaction causes a balance of the account to surpass an account balance threshold.

Another embodiment of the invention is directed to a mobile phone having at least one processor, a contactless element coupled to the processor, and a memory. The contactless element is configured to communicate contactlessly with an access device having a contactless reader. The memory is coupled to the processor and stores a mobile application for directing the processor to provide an interface for a consumer to create a request for enrollment in a balance alert program and to transmit the request to an issuer associated with an account that is associated with the mobile phone.

Another embodiment of the invention is directed to a mobile phone having at least one processor, a contactless element coupled to the processor, and a memory. The memory stores instructions for directing the processor to send account information, via the contactless element, to the access device during a transaction. The account information associated with an account to be used in the transaction. The processor is also directed to receive a balance alert message and launch an application that is associated with the account and that provides the balance alert message to a user of the mobile phone.

Other embodiments of the invention are directed to computer readable media comprising code for performing the above-described methods as well as systems, apparatuses and devices that perform the methods and/or that use the computer readable media.

These and other embodiments of the invention are described in further detail below with reference to the Figures and the Detailed Description.

BRIEF DESCRIPTION OF THE DRAWINGS

FIG. 5A shows a format 500 for a credit or debit balance alert request according to an embodiment of the present invention.

FIG. 5B shows a format 560 for a credit or debit balance alert request according to an embodiment of the present invention.

DETAILED DESCRIPTION

Embodiments of the invention relate to providing account balance alerts to a mobile phone used to initiate a transaction when an account balance associated with an account is close to a credit limit (e.g., at the credit limit) in the case of a credit account or when an account balance is within a threshold of zero (or a minimum balance) in the case of a debit account. When a consumer uses the mobile phone to access credit or funds in an account to make a purchase, embodiments check to see if the purchase would create an account balance within a set threshold. The threshold is preferably chosen by the consumer. If the threshold has been surpassed, then an account balance alert message is automatically sent to the mobile phone. Given that the mobile phone was just used to make the purchase, the consumer will be timely notified of the approach of the balance to the credit/debit limit. Thus, the consumer can take corrective action in a timely manner.

I. Payment Processing Systems with Mobile Phone

Figure 1:
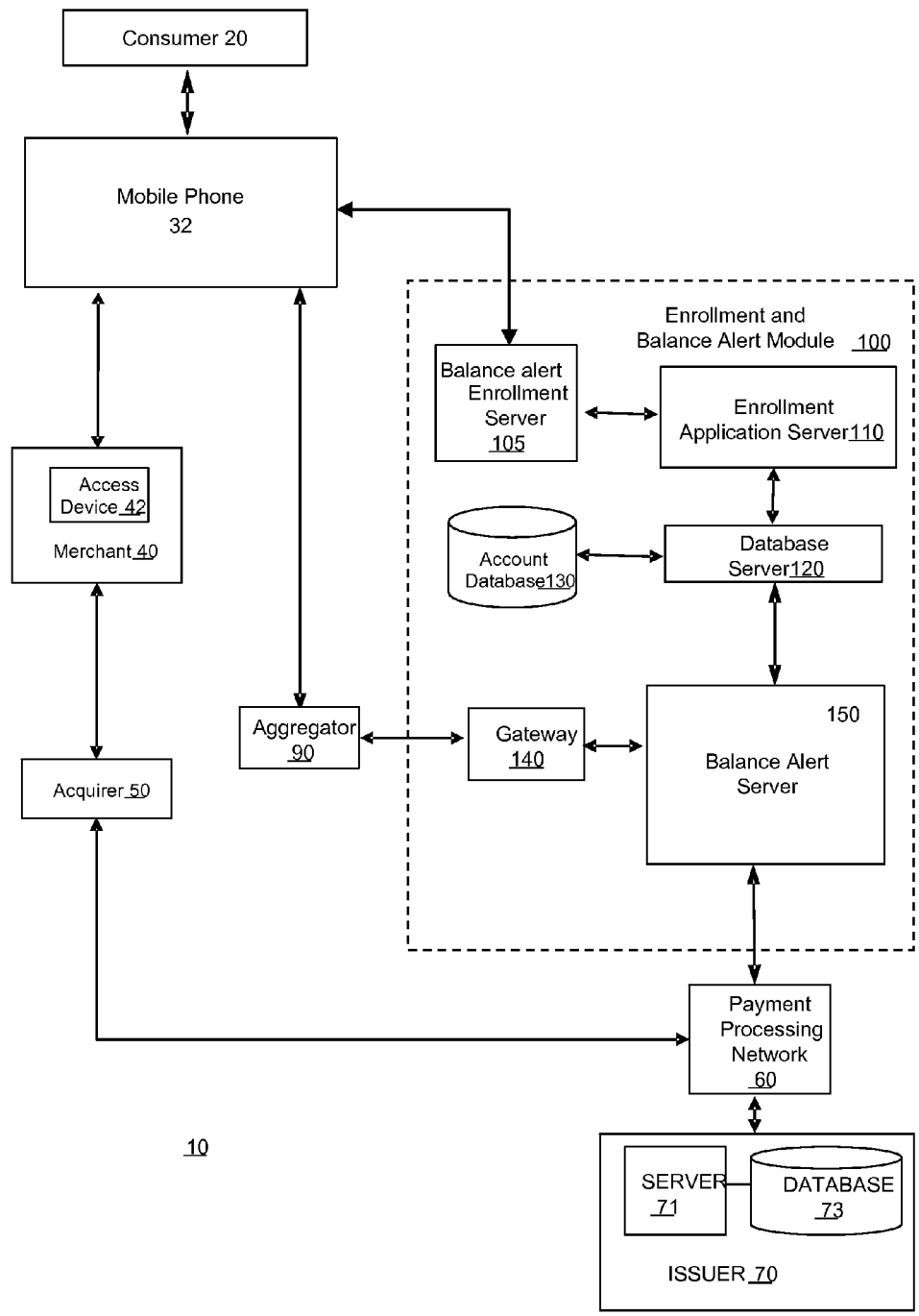
FIG. 1 shows a system 10 that can be used in an embodiment of the invention.

FIG. 1 shows a system 10 that can be used in an embodiment of the invention. For simplicity of illustration, one merchant, one issuer, one acquirer, one mobile phone, and one consumer are shown. It is understood however, that embodiments of the invention may include multiple merchants, issuers, acquirers, mobile phones, and/or consumers. In addition, some embodiments of the invention may include fewer than all of the components shown in FIG. 1(a). Also, the components in FIG. 1(a) may communicate via any suitable communication medium (including the Internet), using any suitable communication protocol.

The system 10 includes a merchant 40 and an acquirer 50 associated with the merchant 40. In a typical payment transaction, a consumer 20 may initiate a transaction (such as purchasing goods or services or otherwise moving money in or out of an account) at the merchant 40 using a mobile phone 32. The acquirer 50 can communicate with an issuer 50 via a payment processing network 60.

The acquirer 50 is typically a bank that has a merchant account. The issuer 70 may also be a bank, but could also be business entity such as a retail store. Some entities are both acquirers and issuers, and embodiments of the invention include such entities. The issuer 70 may operate a server computer 71, which may have a computer readable medium comprising code for performing the functions that the issuer 70 performs. A database 73 comprising account number information and other information may be operatively coupled to the server computer 71.

The consumer 30 may be an individual, or an organization such as a business that is capable of purchasing goods or services.

The mobile phone 32 may be part of or be a device in any suitable form that can send and receive phone calls, text messages (such as short message service), chat messages, or other information via a knowledge or assignment of a phone number. For example, cellular or mobile phones, personal digital assistants (PDAs), pagers, or other mobile devices are mobile phones.

Figure 2:
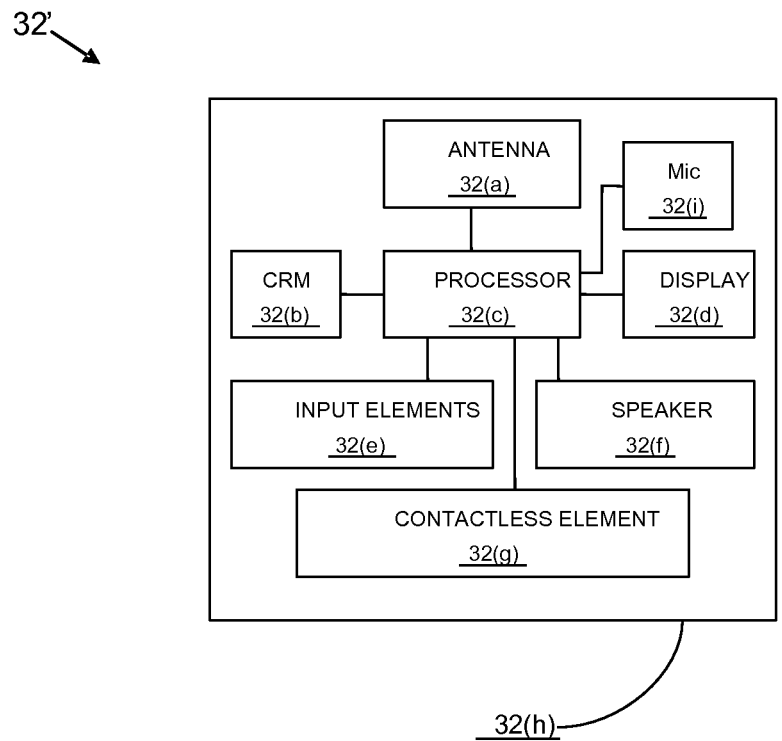
FIG. 2 shows an exemplary mobile phone 32' according to an embodiment of the present invention.

FIG. 2 shows an exemplary mobile phone 32' according to an embodiment of the present invention. FIG. 2 shows a number of components, and the mobile phones according to embodiments of the invention may comprise any suitable combination or subset of such components.

A computer readable medium 32(b) may be present within the body 32(h), or may be detachable from it. The body 32(h) may be in the form a plastic substrate, housing, or other structure. The computer readable medium (CRM) 32(b) may be one or more memory units, which store data and may be in any suitable form including an electronic memory chip (such as DRAM, flash memory, or the like) or a magnetic memory device, such as a hard drive having a magnetic disk.

The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the mobile phone 32'.

In some embodiments, and regardless of the type of wireless mobile phone that is used, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile phone 32' further includes a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) mobile phone 32' and data or control instructions transmitted via a cellular network may be applied to contactless element 32(g) by means of a contactless element interface (not shown). A memory of CRM 32(b) may store such control instructions, e.g., embodied as a mobile application discussed later. The contactless element interface functions to permit the exchange of data and/or control instructions between the mobile device circuitry (and hence the cellular network) and an the contactless element 32(g). An antenna 32(a) may be used for such purposes, as well as for sending and receiving other data transmission, such as phone calls or text messages.

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile phone 32' and an interrogation device. Thus, the mobile phone 32' is capable of communicating and transferring data and/or control instructions via both cellular network with antenna 32(a) and near field communications capability with contactless element 32(g).

The mobile phone 32' may also include at least one processor 32(c) (e.g., a microprocessor) for processing the functions of the mobile phone 32' and a display 32(d) to allow a consumer to see phone numbers and other information and messages. Software instructions on CRM 32(b) may direct processor 32(c) to perform any number of actions pertaining to data communication, as well as for performing transactions and configuring accounts associated with the data stored on CRM 32(b), as mentioned above. The mobile phone 32' may further include input elements 32(e) to allow a consumer to input information into the device, a speaker 32(f) to allow the consumer to hear voice communication, music, etc., and a microphone 32(i) to allow the consumer to transmit her voice through the mobile phone 32'.

Referring again to FIG. 1, the payment processing network 60 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 60 may include a server computer. A "server computer" or "server" is typically a powerful computer or cluster of computers. For example, the server computer can be a large mainframe, a minicomputer cluster, or a group of servers functioning as a unit. In one example, the server computer may be a database server coupled to a Web server. The payment processing network 60 may use any suitable wired or wireless network, including the Internet.

The merchant 40 may also have, or may receive communications from, an access device 42 that can interact with the mobile phone 32. In FIG. 1, the access device 42 is located at the merchant 40. However, it could be located at any other suitable location in other embodiments of the invention.

The access devices according to embodiments of the invention can be in any suitable form. Examples of access devices include point of sale (POS) devices, cellular or mobile phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

Figure 3:
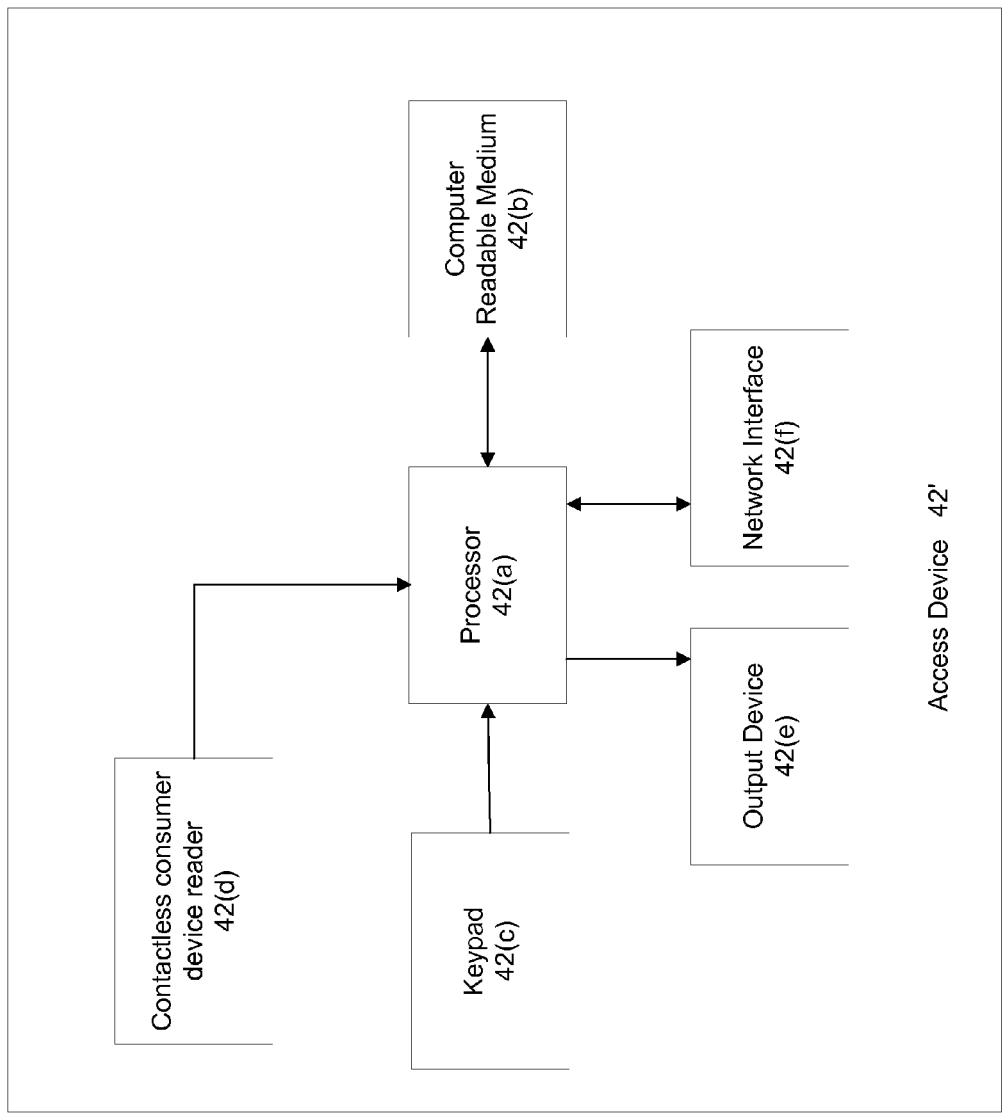
FIG. 3 shows a block diagram showing basic components that may reside in a an access device according to an embodiment of the present invention.

FIG. 3 shows a block diagram showing basic components that may reside in an access device according to an embodiment of the present invention. An exemplary access device 42' (such as a POS terminal) may comprise a processor 42(a), a computer readable medium 42(b), a keypad 42(c), a contactless consumer device reader 42(d), an output device 42(e), and a network interface 42(f), which can all be operatively coupled to the processor 42(a). Exemplary contactless consumer device readers can include RF (radio frequency) antennas, magnetic stripe readers, etc. that interact with the mobile phone 32. Access device 42' may also include other consumer device readers that require contact between the access device and a consumer device, such as magnetic strips. Suitable output devices may include displays and audio output devices. Exemplary computer readable media may include one or more memory chips, disk drives, etc. The network interface 42(f) may allow the access device 42 to send and receive messages from the acquirer 50, payment processing network 60, and/or the issuer 70.

In a typical purchase transaction, the consumer 20 purchases a good or service at the merchant 40 using a mobile phone 32. The consumer's mobile phone 32 can interact with an access device 42 such as a POS (point of sale) terminal at the merchant 40. For example, the consumer 30 may take the mobile phone 32 and bring it within the vicinity of the access device 42, e.g., by waving the phone in front of the access device 42. Thus, in one embodiment, a contactless element 32(g) of the mobile phone 32' and the contactless consumer device reader 42(d) of access device 42' interact with a result being an initiation of a transaction, such as a purchase.

An authorization request message is then forwarded to the acquirer 50. After receiving the authorization request message, the authorization request message is then sent to the payment processing network 60. The payment processing network 60 then forwards the authorization request message to the issuer 70 of an account associated with the mobile phone 32 and consumer 20.

After the issuer 70 receives the authorization request message, the issuer 70 sends an authorization response message back to the payment processing network 60 to indicate whether or not the current transaction is authorized. The payment processing network 60 then forwards the authorization response message back to the acquirer 50. The acquirer 50 then sends the response message back to the merchant 40.

After the merchant 40 receives the authorization response message, the access device 42 at the merchant 40 may then provide the authorization response message for the consumer 20 and/or the mobile phone. The authorization response may also be sent directly to the mobile phone 32 from the issuer 70. The response message may be displayed by the access device 42 or the mobile phone 32, or may be printed out on a receipt.

At the end of the day, a normal clearing and settlement process can be conducted by the payment processing network 60. A clearing process is a process of exchanging financial details between an acquirer and an issuer to facilitate posting to a consumer's account and reconciliation of the consumer's settlement position.

The system 10 also includes an enrollment and balance alert module 100 for processing requests for balance alerts and the balance alerts themselves. The mobile phone 32 is communicably coupled with the module 100 for sending a request to have balance alerts set up on an account associated with the mobile phone 32. In one embodiment, an aggregator 90 is used for collecting and forwarding balance alerts from module 100 to the mobile phone 32. In another embodiment, an aggregator is not used. The payment processing network 60 is also in communication with module 100. The module 100 may be separate from the issuer 70 or it may be a server or module of the issuer 70, such as server 71.

Module 100 comprises a balance alert enrollment server 105, a notification enrollment application server 110, a database server 120, an account database 130, a balance alert server 150, and a gateway 140. Enrollment server 105 is in communication with an enrollment application server 110 which is in communication with database server 120 for storing and retrieving information to and from database 130. Database server 120 is also in communication with balance alert server 150. Balance alert server 150 is also in communication with gateway 140.

Balance alert enrollment 105 refers to a device that receives enrollment information from consumer 20 via mobile phone 32 and sends the enrollment information to enrollment application server 110, which may store the enrollment information in account database 130. Account database 130 may receive and store new or updated enrollment information and other account information.

Enrollment information includes trigger information that describes the occurrences that must take place to trigger balance alerts (e.g. balance threshold values). Consumer 20 may define the trigger information when enrolling in a program to receive balance alerts.

In some cases, balance alerts are triggered by actions taken by consumer 20 or another suitable entity. For example, a notification may be triggered by using of mobile phone 32 at access device 42 by consumer 20 or by merchant 40. In another example, a notification may be triggered by the completion of a transaction on an account associated with mobile phone 32.

Some of the embodiments described below may use a payment processing system like the one described above, or any suitable combination of components in the payment processing system.

II. Payment Modes with Mobile Phone

In an embodiment of the present invention, there can be three modes available for initiating transactions with a mobile phone having a contactless element. Each of the modes may exist separately or in combination for a mobile phone.

In the first mode (automatic), the phone is always in payment mode. When the phone is in the vicinity of a contactless POS device, the payment application automatically processes the transaction.

In a second mode (manual—no password), a transaction is manually initiated by a consumer when in proximity to an access device, and there is no need to enter a password. Accordingly, the consumer can manually activate a payment application on the phone, and if there is more than one instance of the payment application, the user can select the payment application to use for the transaction. The mobile application can support the ability to have only one payment application visible to the contactless reader.

In a third mode (manual—password), a transaction is manually initiated by a consumer when in proximity to an access device, and a password is required. The consumer can enter the consumer-configured mobile application password before manually activating the payment application.

The issuer can specify which of the payment configurations is the default or can allow the consumer to select the default during a configuration. The manual payment configurations include the specific amount of time that the payment application will remain active. Thus, after a timeout period, the consumer can manually activate the payment application again if the transaction was not initiated. As mentioned above, more than one payment application may reside in the mobile phone, e.g., in a CRM of the phone, which may be in a secure element. One of the payment applications may be selected as a default payment application.

A. Automatic (Always On)

Automatic (always on) proximity payment mode makes it possible for the consumer to use the mobile phone for proximity payment at any time, regardless of whether the phone is in use or a mobile application has been opened. In one embodiment, the automatic proximity mode enables a secure element on the phone to emulate a contactless card and interact automatically with a contactless reader.

The phone's initial state can be in any number of states. For example, the phone may or may not be in a phone call, payment applications or non-payment application may or may not be running, and NFC may be on in tag mode. In one embodiment, the phone displays a contactless indicator in the phone's status zone. Depending on the particular NFC capabilities of the phone, proximity payment may be active even when the phone is off. Also, the phone may be powered off or the battery is dead, the NFC may be passively on in tag mode. Where NFC is off, it may be turned on automatically in tag mode by the phone's firmware when presented in the range of a contactless reader. In one embodiment, the final state is the same as the initial state.

An exemplary transaction, may occur as follows. The consumer places the phone in the vicinity of a contactless reader. The mobile payment application is alerted. The payment application can pass account information stored in the secure data element in the phone to the contactless reader. The reader obtains the account information from the secure data element on the phone and completes the transaction. In one embodiment, the mobile application may be launched so that the phone displays the "Payment Sent" page for a fixed amount of time (e.g. 15 seconds) or until the consumer exits the page. The phone can then revert to its previous state.

In one embodiment, when the payment is configured as automatic (always on), the mobile application can be launched and can display the "Payment Sent" page whenever the phone comes into proximity of the contactless reader. To detect when the phone is in proximity of a contactless reader, the mobile application in the phone can be alerted when an attempt is made to access a payment application ID. The "Payment Sent" page can display information about the issuer brand, the payment processing network brand, the contactless indicator, and a message "Payment Sent". In another embodiment, the payment application passes a data to the contactless reader that indicates the transaction was performed with a mobile phone.

B. Manual (No Password) Proximity Payment Mode

In this mode, the consumer manually accesses proximity payment capability directly through the mobile application after the consumer has entered the consumer-configured password to run the mobile application. In one aspect, the option to manually select a specific payment application for payment is available, even when another instance has been designated as automatic (always on).

In one embodiment, after the mobile application is opened, a selection page is presented with options such as "Pay," "Messages," "Manage Account," and "Offers." When the consumer selects a pay or ready-to-pay function, the secure element is enabled to emulate a contactless card and interact with a contactless reader. A "Ready To Pay" page may displayed at this point. The "Ready to Pay" page can display among other things: brand names, the contactless indicator, a counter indicating the amount of time the proximity payment is active, and the text "Hold Phone To Reader."

The mobile application can send a command to the payment application that will make the corresponding payment application visible when presented to a contactless reader. This mode can remain active until a specified time period has elapsed (e.g. 30 seconds) or until the consumer either conducts a payment transaction or exits the application. If the timeout period elapses, and the consumer has not conducted a proximity payment transaction, the mobile application can deactivate the proximity payment function, requiring the consumer to reactivate it to proceed with the transaction.

When a transaction has been completed, the mobile application may display a "Payment Sent" page and/or the contactless indicator from the phone's status zone. In one aspect, to detect whether the phone has conducted a transaction, the mobile application can be alerted when an attempt is made to access a payment application ID.

In one embodiment, either after a timeout or a transaction, the phone may revert back to the state prior to the initiation of the mobile application. In another embodiment, after a timeout the phone may revert back to the state before the ready to pay page was launched.

In one aspect, the phone is idle (i.e. not in a phone call), the mobile application is not running, and the NFC modem on the phone may be either on or off but the payment application is not visible to a contactless reader.

C. Manual (With Password) Proximity Payment Mode

In one embodiment, after entering a password to run the mobile application, a selection page is presented with options such as "Pay," "Messages," "Manage Account," and "Offers." When the consumer selects a pay or ready-to-pay function, the secure element is enabled to emulate a contactless card and interact with a contactless reader. A "Ready To Pay" page may displayed at this point. The "Ready to Pay" page can display among other things: brands, the contactless indicator, a counter indicating the amount of time the proximity payment is active, and the text "Hold Phone To Reader."

The mobile application sends a command to the payment application that can make the corresponding payment application visible when presented to a contactless reader. This mode remains active until a specified time period has elapsed (e.g. 30 seconds) or until the consumer either conducts a payment transaction or exits the application. If the timeout period elapses, and the consumer has not conducted a proximity payment transaction, the mobile application deactivates the proximity payment function, requiring the consumer to reactivate it to proceed with the transaction. If the consumer has not exited from the Visa Mobile Application after the timeout, the consumer may not need to reenter the password. Other aspects of this mode are similar to the manual mode with no password.

D. Account Management

Issuers (or other entities such as payment processing organizations) can send text messages to the consumer's phone to help the consumer manage his or her account. The issuer's systems sends the messages to a messaging service provider, which formats the messages and then delivers them via a mobile operator's network to a transaction message repository in the mobile application on the phone. The messages can be a response to the consumer's inquiry about an account balance, a purchase confirmation and receipt, an alert when the account balance has reached a specific threshold, a reminder when a payment is due, or a payment acknowledgement.

The consumer can send messages to the issuer to request that the issuer send messages such as alerts when an account balance has reached a specific threshold, a transaction has reached a specific threshold, or a reminder that a payment is due. These messages are also sent via the messaging service provider.

The discussion below specifically focuses on the use of balance alert messages to notify the consumer that the consumer has just surpassed a threshold amount associated with a credit or debit account.

III. Customizing Account Balance Alerts

Embodiments of the invention are directed to customized alerts for mobile phone transactions. In these embodiments of the invention, a consumer may customize the alert trigger to be when a transaction causes a balance threshold to be surpassed. For a credit account, when a transaction causes a balance on a credit account to be within a predetermined amount (e.g. $100) of a credit limit (e.g., balance=$1,920 and limit=$2,000), a balance alert message would be sent to the mobile phone. For a debit account, when a transaction causes a balance on a debit account to be within a predetermined amount (e.g. $200) of zero (e.g., balance=$175), a balance alert message would be sent to the mobile phone.

The consumer may use an interface on the mobile phone to indicate how and/or when the consumer is to be alerted when the consumer's mobile phone is used. In alternative embodiments, the consumer could use a separate Web-based computer to configure how and/or when the consumer is to be alerted when the consumer's phone is used. In embodiments of the invention, the consumer can specify whether he wants alerts set separately for each account number associated with the mobile phone that he has. He can also specify that any alerts are provided at the same time and under the same conditions across all accounts associated with the mobile phone associated with the consumer. For example, data relating to more than one account number.

Figure 4:
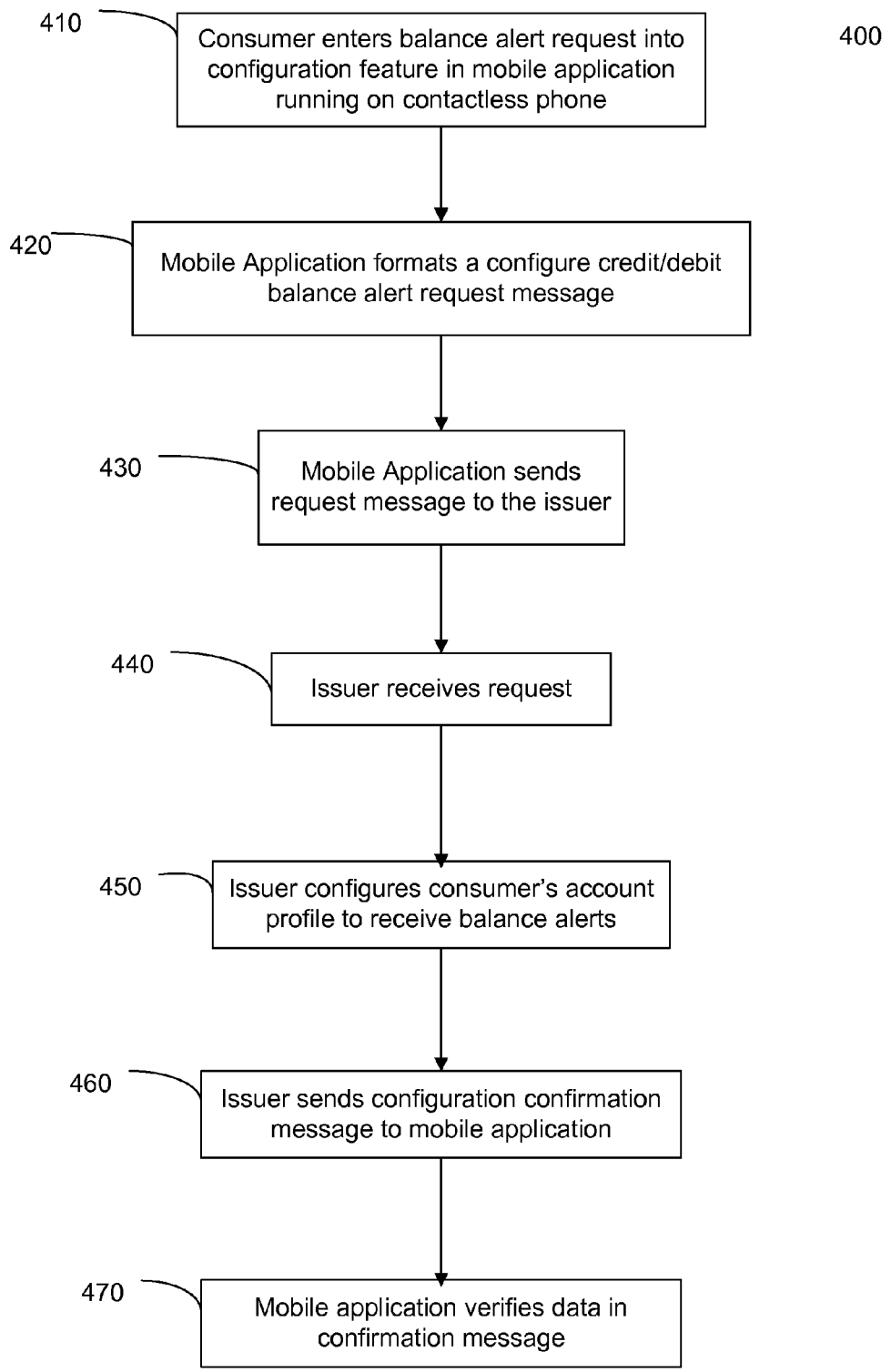
FIG. 4 is a flowchart of a method 400 for configuring balance alerts for an account associated with a mobile phone according to an embodiment of the present invention.

FIG. 4 is a flowchart of a method 400 for configuring balance alerts for an account associated with a mobile phone according to an embodiment of the present invention. The phone has a mobile application (e.g. stored in a CRM) that is used in the configuring process and running on a processor of the mobile phone. In one aspect, the mobile application is specific to the account that is being configured for balance alerts. Thus, in one embodiment, for different accounts a different mobile application is used. In another embodiment, different instances of a same mobile application are used for different accounts. In yet another embodiment, an enrollment of the mobile phone to receive balance alerts according to the configuration is set by the issuer (or other entity mentioned herein) of the account.

In step 410, the consumer enters a balance alert request into a configuration feature in a mobile application running on the mobile phone. To accomplish this, the mobile application may be first opened and a manage account or other configuration option may be chosen. The consumer may then enter the threshold debit/debit balance at which a balance alert will be generated. The threshold balance may be entered in any number of ways. For example, it can be entered as a raw balance or a relative value. For example, a raw value would be if the balance is within $100 of a known credit limit (e.g., a credit limit of $5000) or within $100 of $0. The raw value for the credit limit may also be expressed as a set value of, for example, $4500, which would be within $500 of the credit limit.

A relative value expressed as a percentage (e.g., within 5% of a credit limit for a credit account or within 5% of funds left after a deposit of initial funds in a debit account). Confirmation of the amount may be requested by the consumer by entering the appropriate request into the mobile phone. The consumer can also enter the desired state of the balance alert feature (i.e. ON/OFF) on his or her mobile phone. The keypad on the phone may be used to input the configuration options and values.

In one aspect, an interface to the issuer's existing remote banking application is supported. The consumer may also need to select which account and which issuer the balance alerts are being configured for. In one embodiment, immediately after setting the alert, the mobile application provides the consumer with a message that states that the configuration has been completed.

In step 420, the mobile application formats a configure credit/debit balance alert request message. In one aspect, this is done after the consumer selects that the alert has been set.

FIG. 5A shows a format 500 for a credit or debit balance alert request according to an embodiment of the present invention. A unique message identifier 510 is mandatory and provides an identifier of the alert request. The issuer identifier 520 ensures that the proper issuer is contacted. The account identifier 530 ensures that the proper account from the issuer is configured. Note that there may be multiple issuer accounts associated with the consumer and/or the mobile phone. The value 540 for the debit/credit balance alert is the threshold from the credit limit (in the case of a credit account) or zero (or a minimum balance in the case of a debit account) that is used to send a balance alert. The flag 550 for the balance alert indicates the status of the account for balance alerts.

Referring again to FIG. 4, in step 430, the mobile application sends a request message to the issuer and/or a enrollment and balance alert module, such as module 100. In one embodiment, there is a payment processing network (e.g. network 60) that acts as an intermediary to handle configure balance alert messages between the consumer and the issuer. In another embodiment, there is a message aggregation system that handles this responsibility.

In one embodiment, the message is sent through the mobile network to which the consumer subscribes for using the mobile phone. In one aspect, the mobile network offers reliable delivery of the configure credit balance alert messages, confirms that configure credit balance alert messages have been sent, and confirms that configure credit balance alert messages have been received.

No account information regarding the actual account needs to be passed over-the-air (OTA), or if such information is used, any information that is passed may be passed securely so that its integrity can't easily be compromised as it is transmitted over the mobile network.

In step 440, the issuer (or another entity such as a payment processing organization, which can act as a stand in processor for the issuer) receives the request. For example, the balance alert enrollment server 105 in FIG. 1 may receive the request.

In embodiments of the invention, there are possible exception conditions that may be taken into consideration. For example, the message to configure the balance alerts may not successfully make it to the issuer due to issuer system unavailability, due to mobile network unavailability, or due to message aggregator unavailability. The same three exception conditions also apply for the confirmation message from the issuer. Such exception conditions may handled by a resending of the request by the mobile application when a reply or confirmation is not received as detailed below.

In step 450, the issuer (or other entity) configures the consumer's profile on the account to receive balance alerts. For example, enrollment application server 110 may interact with database server 120 and database 130 to update a profile of the account in the database 130. In one aspect, the issuer (or other entity) can act on standardized configure credit balance alert request messages as soon as they are received.

In step 460, the issuer sends a configuration confirmation message to the mobile application. For example, balance alert enrollment server 105 can send the confirmation message back to the mobile application. In one aspect, there is a standard message format for the configure credit balance alert confirmation response to the mobile application.

FIG. 5B shows a format 560 for a credit or debit balance alert request according to an embodiment of the present invention. A unique message identifier 570 provides an identifier of the alert request. The issuer identifier 580 ensures that the proper issuer is contacted. The account identifier 590 ensures that the proper account from the issuer is configured. Note that there may be multiple issuer accounts associated with the consumer and/or the mobile phone.

In one embodiment, the messages for configure credit balance alert request and configure credit balance alert response may need to be encrypted, signed, and authenticated during transmission to ensure that the credit balance information is not viewable by unauthorized parties and tampered with, and from a legitimate consumer and/or issuer.

In another embodiment, there is a message aggregation system which ensures delivery of messages to the mobile network and to the mobile phone. The message aggregation system should be able to interface with other participant systems using standard electronic communications mechanisms that offer real time delivery of such messages. In yet another embodiment, the messaging service provider is able to split up and assemble SMS and/or MMS messages as necessary for mobile operator requirements.

In one aspect, if no configure credit balance alert response is received after a request has been sent in a prescribed period of time, the mobile application repeats the request message.

Referring again to FIG. 4, in step 470, the mobile application verifies data in confirmation message. For example, upon receipt of a configure credit balance alert response, the mobile application is able to determine which instance of the platform the message is intended for, and utilize that instance as appropriate for processing of the response message. The mobile application can also check whether the message is properly formulated and that the consumer account identifier matches the account represented by the payment account in the platform instance.

The consumer does not have to be alerted about whether the configure balance alert operation with the issuer has been successful. Only the consumer's choices need to be confirmed from within the mobile application at the time these choices are made.

IV. Receipt of Account Balance Alerts

Once the account balance alert messages have been configured for a mobile phone, the mobile phone can begin receiving balance alert messages when a threshold has been surpassed. The threshold can be a predefined value set by the consumer as described above, or it could be set to the issuer or another entity. In one embodiment, the issuer generates the balance alert, which is sent to the consumer's mobile phone.

Figure 6:
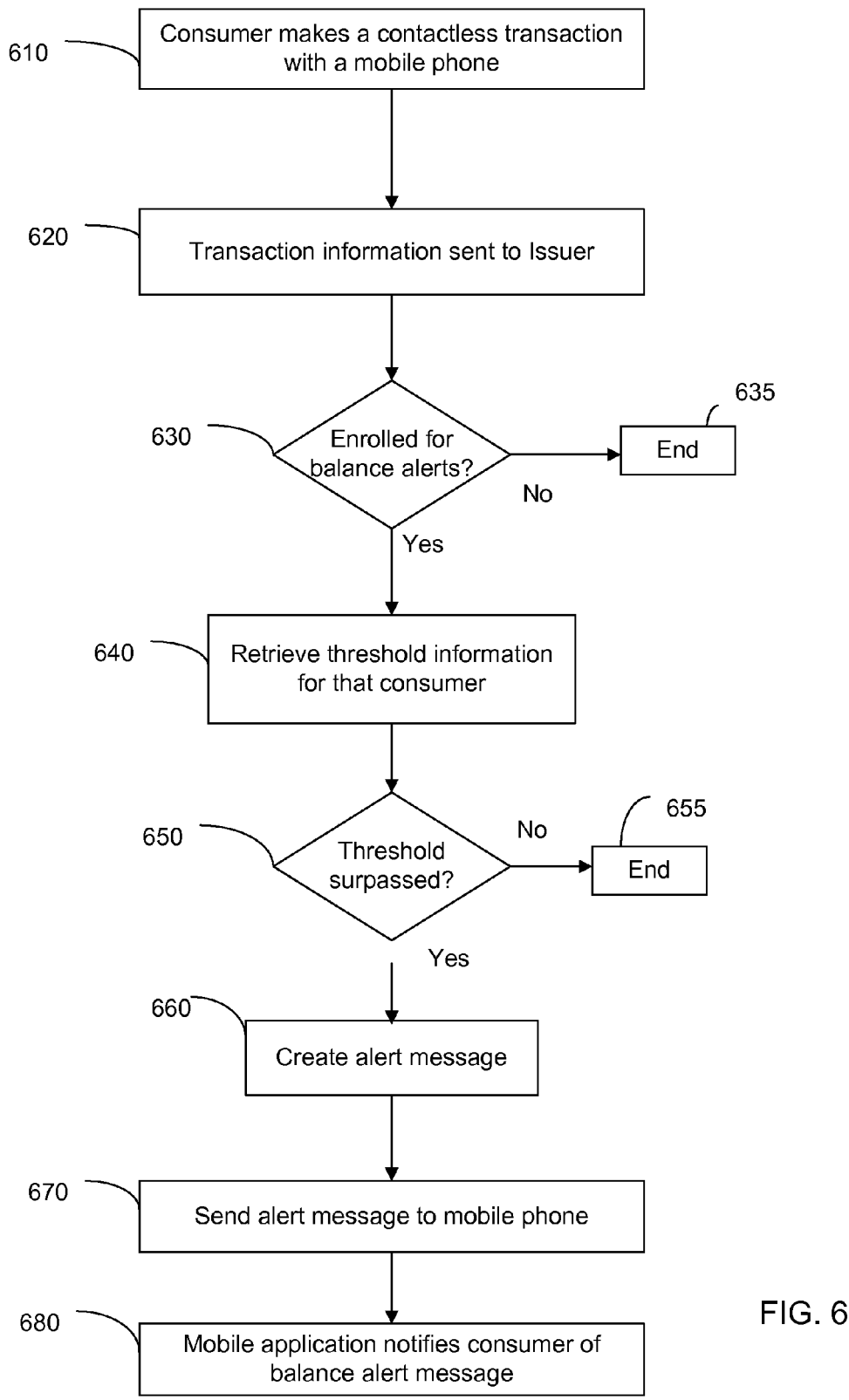
FIG. 6 is a flowchart illustrating a method 600 for providing a balance alert to a mobile phone used in a transaction according to an embodiment of the present invention.

FIG. 6 is a flowchart illustrating a method 600 for providing a balance alert to a mobile phone used in a transaction according to an embodiment of the present invention. In step 610, the consumer makes a contactless transaction with a mobile phone. A transaction may be initiated and performed as described above. The transaction is then completed. For example, a merchant may receive money from the debit/credit account that was used and that was associated with the mobile phone.

In step 620, the transaction information (e.g. amount of a purchase) is sent to the issuer. The purchase information may be sent at any number of times. For example, the information may be sent during a processing of a request for approval of the transaction. The information may also be sent again from the merchant after the transaction has completed. The purchase information also could be sent from the mobile phone after the transaction has been completed. The transaction information at least includes an identification of the account used for the transaction.

In step 630, it is determined whether the account associated with the mobile phone has been enrolled in balance alerts. In one embodiment, the balance alert server 150 communicates with the database server 120 and the account database 130 to retrieve account profile data. The balance alert server 150 then uses the account profile data to make the determination. In one embodiment, if the mobile phone has not been enrolled, then the method stops at step 635. In another embodiment, the method may continue but have a result of any step stored and not have an alert message sent to the mobile phone. If the mobile phone has been enrolled, then the method continues to step 640.

In step 640, the threshold value is retrieved for that consumer. Such a threshold value may be a default value or entered by the consumer. In one embodiment, the threshold value is retrieved from the database 130 by the balance alert server 150. In one aspect, the threshold value is an amount that a credit balance may be in relation to a credit limit. For example, the threshold value may be $100 which signifies that for a credit limit of $2000 the threshold balance is $1900. In another aspect, the threshold value is an amount a bank or debit balance may be within $0. For example, the threshold value may be $100 which signifies that the threshold balance is $100.

In step 650, it is determined whether the threshold value has been surpassed. The determination is accomplished by any type of comparison of the current balance to the threshold value. The current threshold value is the account balance after the most recent transaction. The comparison may be direct comparison of the balance with the threshold value, which may occur for a debit account. For example, if the balance is less than the threshold value (balance=$50 & threshold=$100), then the threshold has been surpassed. Note that a threshold value may be in cents or percentages of cents so that a threshold value of $100.01 would correspond to a test of whether the balance is equal to or less than $100.

For a credit account, the comparison may be done in relation to a credit limit. For example, the amount left in the credit may be computed, and it is determined whether the amount of credit left is within the threshold value. A raw value of the total amount of credit can also be used as the threshold value. If the threshold is not surpassed, then the method ends at step 655. If the threshold is surpassed, then the method continues to step 660.

In step 660, an alert message is created. In one embodiment, the alert message is created to a prescribed format. The alert message may be in the form of ASCI characters, a digitized voice, HTML, or any other suitable manner.

In one embodiment for a credit account, the format includes mandatory data of a unique message identifier number, an issuer identifier number, a current balance value, and an available credit value. An optional account identifier may also be included. In one embodiment for a debit/bank account, instead of an available credit a funds available for withdrawal value and an available funds value are provided.

In step 670, the alert message is sent to the mobile phone. For example, the balance alert server 150 may send the alert message to the gateway 140, which can then send the message to an aggregator 90. The mobile phone may then receive the message from the aggregator, e.g. via the mobile network that the mobile phone has a subscription. The payment processing network may also be involved. In another embodiment, the mobile phone receives the message directly from the balance alert module 100.

Figure 7:
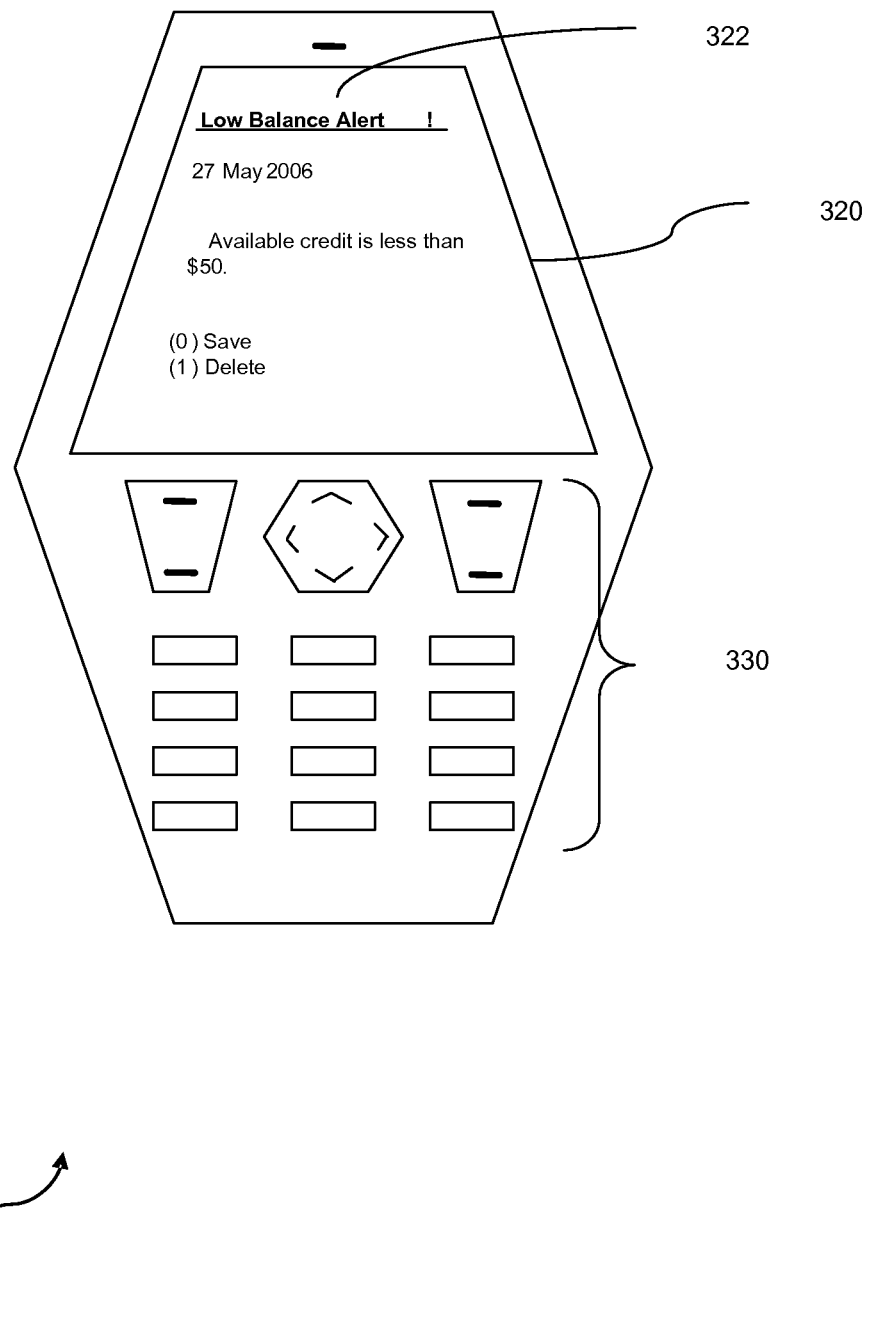
FIG. 7 is a schematic drawing of a mobile phone 700 displaying a balance alert in accordance with an embodiment of the invention.

In step 680, the mobile application on the mobile phone notifies the consumer of balance alert message. For example, after a balance alert message has been received by the consumer's mobile phone, the consumer may be informed that a balance alert message has been received (i.e., text such as "Your credit account balance has exceeded your predefined threshold"). FIG. 7 shows a balance alert message on an exemplary mobile phone.

In one embodiment, a processor of the mobile phone is directed to launch the same mobile application that was used to configure the account for receiving balance alerts. In order to launch the mobile application, the balance alert message can include an identifier that is associated with the mobile application. In one aspect, the identifier is an issuer identifier. In another aspect, the identifier is an account identifier. Software on the mobile phone can parse the message to determine the identifier and then launch the mobile application. The identifier may, for example, be in the header of the balance alert message.

In another embodiment, the processor is directed to launch an application that is associated with the account and that provides the balance alert message to a user of the mobile phone. This application may be different than the one used to configure the account, for example, when a desktop computer is used to configure the account. An identifier in the balance alert message may be recognized by software in the mobile phone to launch the account-specific application. In one aspect, the identifier is unique to the account. In one embodiment, every account on the mobile phone will have a different application associated with it. In another embodiment, groups of accounts will have a same application associated with it, but one group will be associated with a different application than another group. In yet another embodiment, a single mobile application will be associated with all accounts, but different instances and/or features are used for different accounts or groups of accounts.

Another embodiment of the invention is directed to a mobile phone having at least one processor, a contactless element coupled to the processor, and a memory. The memory stores instructions for directing the processor to send account information, via the contactless element, to the access device during a transaction. The account information associated with an account to be used in the transaction. The processor is also directed to receive a balance alert message and launch an application that is associated with the account and that provides the balance alert message to a user of the mobile phone.

Additionally, when the credit balance alert message is received by the mobile application, the consumer interface can update the account summary information, e.g., with the current balance and available credit if appropriate. In one aspect, this summary update is only done where no platform password is configured.

In one embodiment, when the balance alert message is received by the mobile application, regardless of whether a password is configured or not, a summary of the balance alert (balance message summary) can be displayed with an option to view the account summary. In another embodiment, at the balance message summary, if a platform password is configured, and if the mobile application is not running, then the consumer can be prompted to enter the password before the account summary information is displayed. In yet another embodiment, if the mobile application is running when the credit balance alert is received, the balance message summary may be displayed, regardless of what state the mobile application is in.

In one embodiment, even if balance alerts are turned off, but the maximum account balance is exceeded, a credit balance alert message can be sent to the consumer's mobile phone regardless of any pre-set threshold value. Similarly if a debit account goes below zero, a balance alert message may be sent to the consumer's mobile phone, regardless of any pre-set threshold value.

The balance alert messages may be in any suitable form and may be delivered by any suitable method. Some examples of notifications includes a phone call, a voice message, a voicemail message, a short message service (SMS) message e.g. a text message, an instant messaging (IM) message (or other type of chat session), or an email message, or a periodically updated display on a device. Other examples include messages using session initiation protocol (SIP), Wireless Application Protocol (WAP), and other similar protocols and languages assocaited with such.

FIG. 7 is a schematic drawing of a mobile phone 700 displaying a balance alert in accordance with an embodiment of the invention. Mobile phone 700 includes a display 320 for displaying information such as balance alerts, buttons 330 for inputting information such as requests for notifications, a speaker (not shown) to send aural signals to consumer 20, and a microphone (not shown) to receive aural signals from consumer 20. Display 320 includes a dynamic data display 322 for displaying the notification of the updated balance data and alerts for consumer 20. In the illustrated example, dynamic data display 322 is showing the balance alert on the account associated with the mobile phone 70. Buttons 330 include buttons for navigating through a mobile application to enroll in balance alerts, select to view a balance alert, and to a view an account balance summary.

Figure 8:
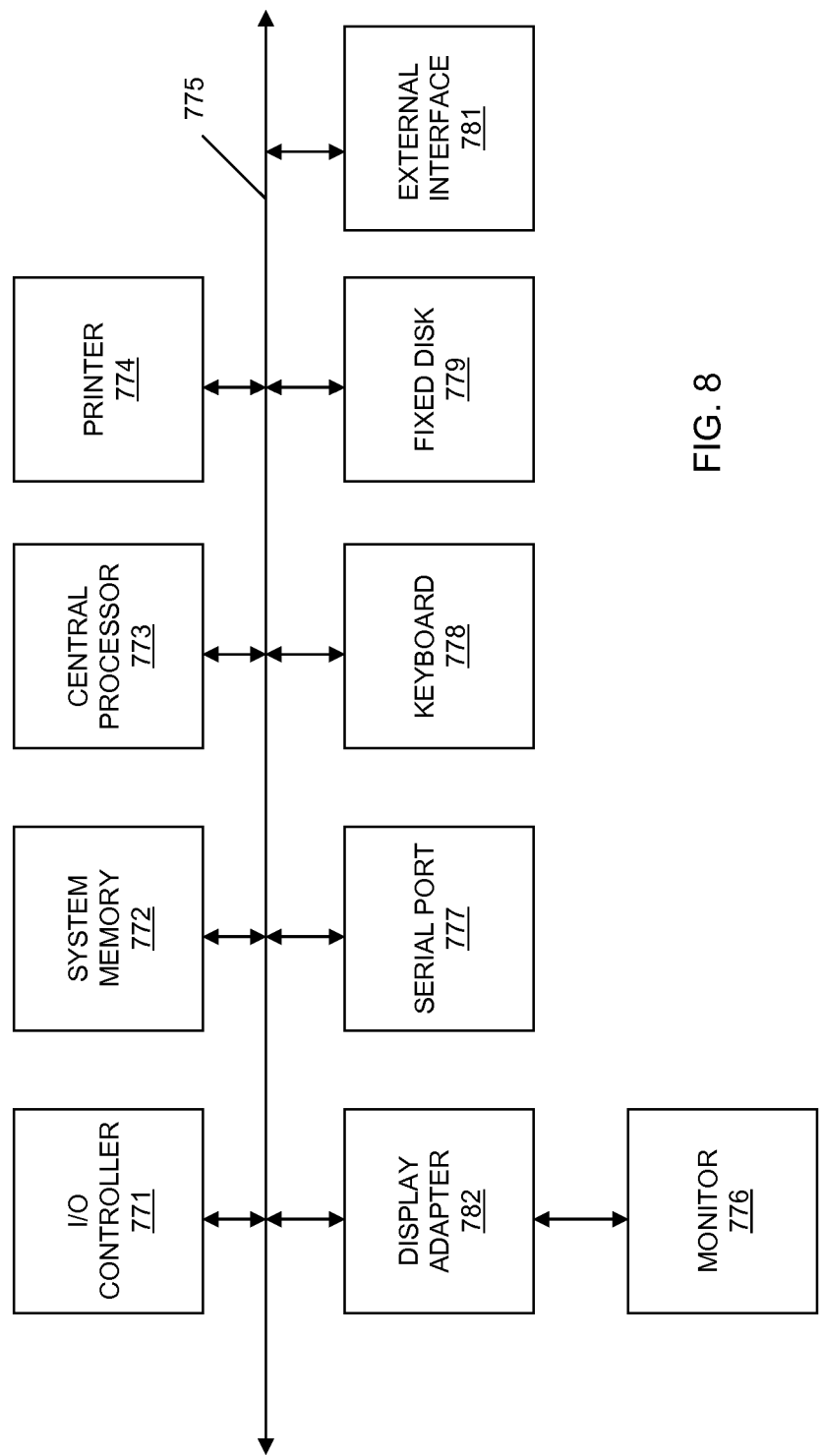
FIG. 8 shows a block diagram of a computer apparatus.

Any of the servers 105, 110, 120, 150, and the access device 42 illustrated in FIG. 1 may utilize any suitable number of subsystems. Examples of such subsystems or components are shown in FIG. 8. The subsystems shown in FIG. 8 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving information for a transaction initiated with a mobile phone having a contactless element, wherein the contactless element is capable of interacting with a contactless reader in an access device, and wherein the mobile phone is associated with an account of a consumer;
   retrieving an account balance for the account of the consumer;
   calculating the account balance after the transaction is completed;
   comparing the calculated account balance to an account balance threshold; and
   sending a balance alert message to the mobile phone when the calculated account balance surpasses the account balance threshold,
   wherein the balance alert message includes a unique message identifier, the calculated account balance, and an application identifier that identifies an application to be launched on the mobile phone upon receipt of the balance alert message, wherein the application identifier includes an issuer identifier, wherein the issuer identifier is used to identify an application associated with the account of the consumer.

2. The method of claim 1, wherein the balance alert message is in the form of an automated phone call.

3. The method of claim 1, wherein the account is a credit account.

4. The method of claim 3, wherein the account balance threshold is a value within a prescribed amount of a credit limit on the account, wherein the calculated account balance surpasses the account balance threshold by being greater than the prescribed amount.

5. The method of claim 1, wherein the account is a debit account.

6. The method of claim 5, wherein the account balance threshold is a prescribed amount above zero, wherein the calculated account balance surpasses the account balance threshold by falling below the prescribed amount.

7. The method of claim 1, further comprising:
prior to receiving the information for the transaction, receiving, from the mobile phone, a configuration message that indicates a request to receive balance alert messages and that includes an account balance threshold.

8. The method of claim 7, further comprising:
transmitting, to the mobile phone, a confirmation message indicating that the mobile phone has been configured to receive balance alert messages for the account.

9. A mobile phone comprising:
at least one processor;
a contactless element coupled to the processor, wherein the contactless element is configured to communicate contactlessly with an access device having a contactless reader;
a memory coupled to the processor, wherein the memory stores a mobile application for directing the processor to:
provide an interface for a consumer to create a request for enrollment in a balance alert program, wherein enrolling in the balance alert program allows the mobile phone to receive a balance alert message that includes a unique message identifier and an application identifier that identifies an application to be launched on the mobile phone upon receipt of the balance alert message, wherein the application identifier includes an issuer identifier, wherein the issuer identifier is used to identify an application associated with the account of the consumer; and
transmit the request to an issuer associated with an account that is associated with the mobile phone.

10. The mobile phone of claim 9, wherein the contactless element is used in an initiation of a transaction, and wherein the mobile application also directs the processor to:
receive a balance alert message associated with the transaction;
create an account balance summary for the account; and
display the summary to the consumer.

11. The mobile phone of claim 9, wherein the mobile application also directs the processor to:
receive a confirmation message that is sent in response to the request for enrollment; and
when the confirmation message is not received within a predetermined amount of time, to resend the request.

12. The mobile phone of claim 9, wherein the mobile application also directs the processor to:
receive a confirmation message that is sent in response to the request for enrollment; and
when the confirmation message is received, to verify that data in the confirmation message corresponds to data sent in the request for enrollment.

13. The mobile phone of claim 9, wherein the request includes an account identifier and a value for an account balance threshold.

14. The mobile phone of claim 9, wherein when a balance alert message is received, the processor is directed to launch the mobile application to provide the message to the consumer.

15. A mobile phone comprising:
at least one processor;
a contactless element coupled to the processor, wherein the contactless element is configured to communicate contactlessly with an access device having a contactless reader;
a memory coupled to the processor, wherein the memory stores instructions for directing the processor to:
send account information, via the contactless element, to the access device during a transaction, the account information associated with an account to be used in the transaction;
receive a balance alert message, wherein the balance alert message includes an application identifier that identifies an application associated with the account to be launched on the mobile phone upon receipt of the balance alert message, and a unique message identifier; and
launch the application that is associated with the account and that provides the balance alert message to a user of the mobile phone,
wherein the application identifier includes an issuer identifier, wherein the issuer identifier is used to identify an application associated with the account of the consumer.

16. The mobile phone of claim 15, wherein the application is account-specific.

17. The mobile phone of claim 16, wherein the memory stores at least one additional application that is associated with a different account.

18. A method comprising:
initiating, by a consumer, a transaction with a mobile phone, wherein information associated with the transaction is sent to an entity associated with an account associated with a consumer and associated with the mobile phone; and
receiving a balance alert message via the mobile phone when an amount associated with the transaction causes a balance of the account to surpass an account balance threshold,
wherein the balance alert message includes a unique message identifier and an application identifier that identifies an application to be launched on the mobile phone upon receipt of the balance alert message,
wherein the application identifier includes an issuer identifier, wherein the issuer identifier is used to identify an application associated with the account of the consumer.

19. The method of claim 18, wherein the application to be launched on the mobile phone provides the balance alert message to the consumer, and wherein the application is specific to the account.

20. The method of claim 19, wherein the mobile phone determines the identifier that is in the balance alert message and initiates the launching of the account-specific application.

21. The method of claim 18, further comprising:
creating, within a mobile application of the mobile phone, a request to be enrolled in a balance alert program of the issuer; and
receiving a message confirming the enrollment.

22. The method of claim 18, wherein the mobile application receives the confirmation message and displays the confirmation message to the consumer.

23. A system comprising:
a database server containing a data base that stores information for an account that is associated with a mobile phone of a consumer; and
a balance alert server that is configured to receive transaction information from a transaction conducted with the mobile phone and that is communicably coupled with the database server, wherein the balance alert server is also configured to send a balance alert to the mobile phone when an amount of the transaction causes a balance of the account to surpass an account balance threshold,
wherein the balance alert message includes a unique message identifier and an application identifier that identifies an application to be launched on the mobile phone upon receipt of the balance alert message,
wherein the application identifier includes an issuer identifier, wherein the issuer identifier is used to identify an application associated with the account of the consumer.

24. The system of claim 23, further comprising:
a balance alert enrollment server that is configured to receive a request for enrollment from the mobile phone; and
an enrollment application server that is configured to cause account information in a database to be updated so that balance alerts will be sent to the mobile phone.

25. The system of claim 24, wherein the balance alert enrollment server is configured to send a confirmation message to the mobile phone after the account information is updated.

26. The method of claim 1, wherein the identifier is an account identifier.

27. The method of claim 1, wherein the application to be launched on the mobile phone upon receipt of the balance alert message is an account-specific application.

28. The method of claim 18, further comprising:
entering, in response to a prompt from the mobile phone, a valid password.

29. The method of claim 28, wherein a balance summary message is displayed only if the entered password is valid.

30. The mobile phone of claim 15, wherein the application identifier includes an account identifier.

31. The mobile phone of claim 9, wherein the mobile application also directs the processor to:
provide an interface for a consumer to indicate when the consumer is to be alerted and by what method the consumer is to be alerted.

32. The method of claim 1, wherein the balance alert message does not include an account identifier.

33. The method of claim 21, wherein the application to be launched is different than the application used to create the request to be enrolled.

34. The method of claim 1, wherein the account of the consumer is a first account, wherein the mobile phone is also associated with a second account of the consumer, and wherein the method further comprises:
receiving information for a second transaction initiated with the mobile phone;
retrieving a second account balance for the second account of the consumer;
calculating the second account balance after the second transaction is completed;
comparing the calculated second account balance to a second account balance threshold; and
sending a second balance alert message to the mobile phone when the calculated second account balance surpasses the second account balance threshold,
wherein the second balance alert message includes a second application identifier that identifies a second application to be launched on the mobile phone upon receipt of the second balance alert message, wherein the second application identifier includes a second issuer identifier, wherein the second issuer identifier is used to identify an application associated with the second account of the consumer.

35. The method of claim 34, wherein the first application and the second application are different.

36. The method of claim 1, wherein the mobile phone is associated with a plurality of accounts of the consumer, wherein the method further comprises:
creating, within a mobile application of the mobile phone, a balance alert request message, wherein the balance alert request message separately indicates whether alerts are desired for each of the plurality of accounts of the consumer; and
receiving a message confirming the balance alert request.

* * * * *